United States Patent
Rouge et al.

(10) Patent No.: US 6,175,620 B1
(45) Date of Patent: Jan. 16, 2001

(54) COMPATIBILITY BETWEEN A TELEPHONE SERVICE WITH SERVER AND A CALLING LINE IDENTIFICATION SERVICE

(75) Inventors: Thierry Rouge, Pleumeur Bodou; Francois Chemin, Lannion, both of (FR)

(73) Assignee: France Telecom, Paris (FR)

( * ) Notice: Under 35 U.S.C. 154(b), the term of this patent shall be extended for 0 days.

(21) Appl. No.: 08/960,284

(22) Filed: Oct. 29, 1997

(30) Foreign Application Priority Data

Oct. 30, 1996 (FR) .................................. 96 13387

(51) Int. Cl.[7] .................................. H04M 15/00
(52) U.S. Cl. .................. 379/207; 379/219; 379/220; 379/142
(58) Field of Search .................. 379/207, 219, 379/220, 229, 230, 140, 142, 209, 127

(56) References Cited

U.S. PATENT DOCUMENTS

| | | | |
|---|---|---|---|
| 5,396,548 | * 3/1995 | Bayerl et al. | 379/140 |
| 5,511,115 | * 4/1996 | Bayerl et al. | 379/142 |
| 5,590,184 | * 12/1996 | London | 379/142 |

* cited by examiner

Primary Examiner—Krista Zele
Assistant Examiner—William J. Deane, Jr.
(74) Attorney, Agent, or Firm—Lowe Hauptman Gilman & Berner, LLP

(57) ABSTRACT

A telephone service using a server designated by a telephone number and connected to a telephone network is made compatible with the telephone network and a calling line identification presentation service. The server joins a first call between a calling user terminal and the server to a second call between the server and a called user terminal. A user of the called terminal has previously subscribed to the calling line identification presentation service. Compatibility is achieved by transmitting the telephone number of the calling terminal in a request to set up the first call between the calling user terminal and the server through the telephone network. The request succeeds a call from the called terminal to the server. During the call from the called terminal to the server, the server stored in memory the telephone number of the called terminal as the terminal that most recently called the calling terminal. A telephone number of the server is replaced in a request to set up the second call with the stored telephone number of the calling terminal in response to the request to set up the first call in the server. The request to set up the second call is transmitted with the telephone number of the calling terminal from the server to the telephone network so that the telephone number of the calling terminal is transmitted from the telephone network to the called terminal.

2 Claims, 1 Drawing Sheet

COMPATIBILITY BETWEEN A TELEPHONE SERVICE WITH SERVER AND A CALLING LINE IDENTIFICATION SERVICE

BACKGROUND OF THE INVENTION

1. Field of the Invention

The present invention is generally concerned with services made available to users of a telephone network by a server connected to said telephone network.

2. Description of the Prior Art

Telephone services are provided by a server external to the central offices of the telephone network and connected to the network via ISDN (Integrated Services Digital Network) interfaces. Services already offered to digital users and, in some cases, to analog users by the ISDN, for example call forwarding, calling line identification presentation, call filtering, ringback, etc., can be provided differently by forwarding calls to a server capable of completing connections between user terminals. A method of the above kind, like that described in the aforementioned patent application, has the advantage of being easily applicable to all types of digital or analog user terminal.

The present invention is more particularly concerned with the use by the same user of a service utilizing a server external to the network and the complementary ISDN calling line identification presentation service, known as the "CLIP service", utilizing CCITT No. 7 type signalling.

The prior art does not provide any method for simultaneously offering to a user the "ringback" service, for example, employing a server external to the central offices of the telephone network and completing connections, and the "CLIP" service. When a calling user terminal sets up a call to a called user terminal having a screen and subscribing to the "CLIP" service, via a server, i.e. at the server by joining a call between the calling terminal and the server to a call between the server and the called terminal, the number shown on the screen of the called terminal is that of the server and not that of the calling terminal.

OBJECT OF THE INVENTION

The main object of this invention is to remedy the aforementioned drawback by providing a method capable of rendering the above services compatible in a simple and practical manner that is transparent to the user.

SUMMARY OF THE INVENTION

According to the invention, a telephone service using a server designated by a telephone number and connected to a telephone network is made compatible with the telephone network and a calling line identification presentation service. The server joins a first call between a calling user terminal and the server to a second call between the server and a called user terminal. A user of the called terminal has previously subscribed to the calling line identification presentation service. Compatibility is achieved by transmitting the telephone number of the calling terminal in a request to set up the first call between the calling user terminal and the server through the telephone network. The request succeeds a call from the called terminal to the server. During the call from the called terminal to the server, the server stored in memory the telephone number of the called terminal as the terminal that most recently called the calling terminal. The server introduces the stored telephone number of the calling terminal as if the stored telephone number were the telephone number of the server. The server introduces the stored telephone number of the calling terminal into a request to set up the second call in response to the request to set up the first call in the server. The request to set up the second call is transmitted with the telephone number of the calling terminal from the server to the telephone network so that the telephone number of the calling terminal is transmitted from the telephone network to the called terminal.

The transmission of the telephone number to the called terminal is in conformance with the calling line identification presentation service.

Typically, the telephone number of the calling terminal is transmitted from the server to the telephone network as a supplementary identification number of the server. The telephone network does not verify this type of number and so the calling line identification presentation service supplies it to the called terminal from the telephone network as if it were the server number.

BRIEF DESCRIPTION OF THE DRAWINGS

Further features and advantages of the invention will be apparent from the following particular description of a preferred embodiment of the invention as illustrated in the corresponding accompanying drawings in which.

DESCRIPTION OF THE PREFERRED EMBODIMENT

Figure 1:
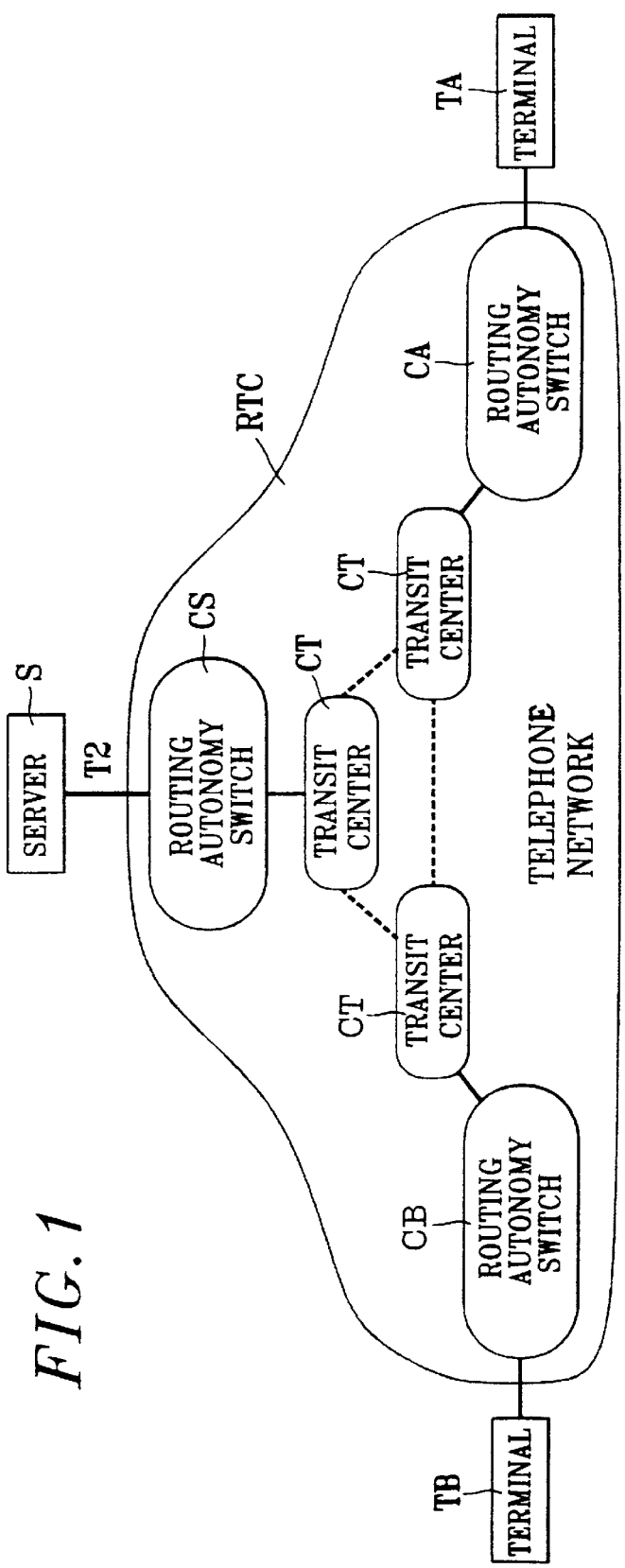
FIG. 1 is a block diagram of a telephone system providing services using a server external to the telephone network.

Referring to FIG. 1, a calling user terminal TA, a called user terminal TB and a server S are connected to a switched telephone network RTC. Switched telephone network RTC conventionally includes central office switches, i.e. routing autonomy switches CA, CB and CS to which user terminals TA and TB and server S are respectively connected, possibly via local office switches (not shown). Network RTC further includes transit centers CT via which the various routing autonomy switches, also known as main user switches, are connected to each other. Server S is a personal computer (PC), for example, or a workstation, and is equipped with one or more ISDN (Integrated Services Digital Network) type S2 interfaces. The connection between server S and the linking switch CS to which the server S is linked, is a primary rate access via a standard 2 048 kbit/s T2 type ISDN interface providing 30 data channels B and once signalling channel D each at 64 kbit/s. User terminals TA and TB are telephones connected to an analog or digital line, for example.

Server S provides particular services to certain user terminals, such as terminal TA in the situation shown in FIG. 1. Hereinafter, exchanges of information between server S and user terminals TA and TB are explained in the context of the "ringback" service merely by way of example.

To provide this service, server S holds in memory the telephone numbers of the last user terminals that requested call set-up to terminal TA. This is possible because all calls to terminal TA are forwarded to server S in linking switch CA of terminal TA. Alternatively, calls to terminal TA are forwarded to server S by switch CA if the calling terminals have not received any response from terminal TA at the end of a predetermined time-delay.

Terminal TA can then set up a call to server S at any time in order to consult a list of user terminal numbers, such as that of terminal TB, that have previously called it, and to request server S to set up a call to terminal TB. Communication between terminal TA and the server can be effected through dialog guided by voice-frequency signals, the server having a voice interface and the user of terminal TA responding to voice messages sent by the server by operating keys of the keypad of the terminal to generate DTMF (Dual-Tone Multifrequency) code signals. After the connection from server S to terminal TB is set up, server S joins the call between calling terminal TA and the server to the call between the server and called terminal TB.

Communications between calling terminal TA, server S and called terminal TB will now be described in more detail. The signalling messages cited hereinafter are defined in CCITT Recommendation Q.931, Fascicle VI.11.

In accordance with the D protocol, server S receives a first signalling message "SETUP" from linking switch CS informing it that calling terminal TA is requesting call set-up to it. Server S then transmits successively to linking switch CS an "ALERTING" message for switch CS to transmit a ringing tone message to linking switch CA of terminal TA and a "CONNECT" message to set up the call to terminal TA.

To set up a call to called terminal TB, the server transmits a "SETUP" message to toll center CS and then waits to receive successive "ALERTING" and "CONNECT" messages in accordance with the D protocol. When the "CONNECT" message has been received from its linking switch CS, constituting the start of a call to terminal TB, server S joins the call between terminal TA and server S to the call between server S and terminal TB by means of an ISDN card.

For some services provided by server S, the two call set-up procedures referred to above are interleaved. Server S waits to receive the "CONNECT" message for the call to called terminal TB before sending the "CONNECT" message for the call to calling terminal TA.

In accordance with the invention, the user of terminal TB has previously subscribed to the ISDN facility "CLIP (Calling Line Identification Presentation) service". To this end, terminal TB has a screen. On each call set-up request from a calling user terminal, the number of the calling terminal is shown on the screen of terminal TB. This number is supplied to terminal TB in a manner that is known in itself by the linking switch CB that receives it, in the network RTC, from the linking switch of the calling terminal, using CCITT No. 7 type signalling.

Figure 2:
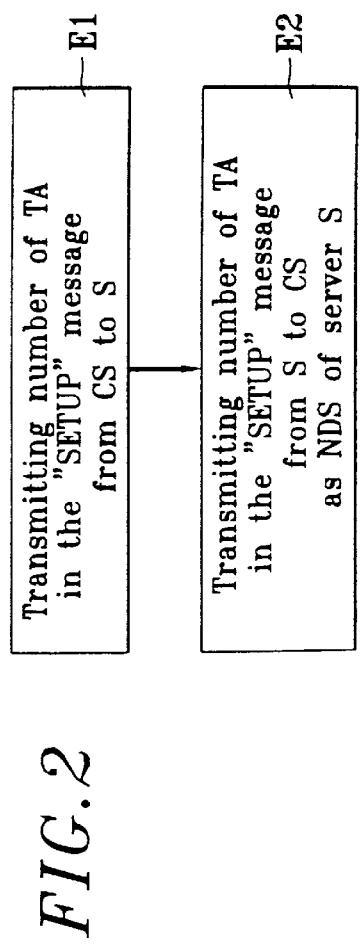
FIG. 2 is an algorithm of the method in accordance with the present invention.

Referring to FIG. 2, during a first step E1 of the method of the invention, on receiving the "SETUP" message relating to the call setup request sent by terminal TA to the server, server S recovers the telephone number of the terminal TA in an "Originating number" information element contained in the above "SETUP" message. This information element is equivalent to the "Calling party number" information element cited in the aforementioned CCITT Recommendation Q.931. Said telephone number of the terminal TA recovered by server S is in practise the installation identification number (NDI) of the terminal TA and is generated by the network RTC. However, if calling terminal TA is an ISDN subscriber and if it generated the supplementary identification number (NDS) at the time of the call set-up request to server S, then the NDS and the NDI of the terminal TA are both included in the "SETUP" message received by server S and server S recovers only the NDS number.

In a second step E2 of the method of the present invention, server S introduces the number (NDS or NDI) of terminal TA recovered during the first step E1 as the supplementary identification number (NDS) of the server, i.e. as if this were the NDS of the server, in an "Originating number" information element contained in the "SETUP" signalling message to be transmitted to linking switch CS to inform network RTC of the call set-up request from the server S to the terminal TB. The telephone network does not verify if the received supplementary identification number (NDS) is that of the calling party, i.e. the server S. Because the network RTC knows the NDS, this number and not the NDI is presented to the called terminal TB by the CLIP service. The terminal TB therefore receives and displays on its screen not the number of the server S but that of the calling terminal TA that called it via the server S.

What we claim is:

1. A method of making compatible within a telephone network a telephone service using a server designated by a telephone number and connected to said telephone network and a calling line identification presentation service, said server joining a first call between a calling user terminal and said server to a second call between said server and a called user terminal, a user of said called terminal having previously subscribed to said calling line identification presentation service, said method comprising the following successive steps of:

transmitting the telephone number of the calling terminal in a request to set up said first call between said calling user terminal and said server through said telephone network, said request succeeding a call from said called terminal to said server during which said server had stored in memory a telephone number of said called terminal as the terminal that most recently called said calling terminal, introducing by said server the stored telephone number of said calling terminal, as if said stored telephone number were the telephone number of said server, in a request to set up said second call in response to the request to set up said first call in said server, and transmitting the request to set up said second call with said telephone number of said calling terminal from said server to said telephone network so that said telephone number of said calling terminal is transmitted from said telephone network to said called terminal.

2. The method claimed in claim 1 wherein said telephone number of said calling terminal is transmitted from said server to said telephone network as a supplementary identification number of said server.

\* \* \* \* \*